(12) United States Patent
Strietzel et al.

(10) Patent No.: US 9,593,951 B2
(45) Date of Patent: Mar. 14, 2017

(54) METHOD FOR INCREASING THE RELIABILITY OF SENSOR SYSTEMS

(71) Applicant: Jena-Optronik GmbH, Jena (DE)

(72) Inventors: Roland Strietzel, Sohland (DE); Klaus Michel, Jena (DE); Dietmar Ratzsch, Wogau (DE)

(73) Assignee: Jena-Optronik GmbH, Jena (DE)

( * ) Notice: Subject to any disclaimer, the term of this patent is extended or adjusted under 35 U.S.C. 154(b) by 680 days.

(21) Appl. No.: 13/738,545

(22) Filed: Jan. 10, 2013

(65) Prior Publication Data

US 2013/0179073 A1 Jul. 11, 2013

(30) Foreign Application Priority Data

Jan. 11, 2012 (DE) .................. 10 2012 000 331

(51) Int. Cl.
 *G01C 21/02* (2006.01)
 *G01S 3/786* (2006.01)
 *B64G 1/36* (2006.01)

(52) U.S. Cl.
 CPC .......... *G01C 21/025* (2013.01); *B64G 1/361* (2013.01); *G01S 3/7867* (2013.01)

(58) Field of Classification Search
 None
 See application file for complete search history.

(56) References Cited

U.S. PATENT DOCUMENTS

| | | | |
|---|---|---|---|
| 5,055,689 A | 10/1991 | Proffit et al. | |
| 5,206,499 A | 4/1993 | Mantravadi et al. | |
| 5,412,574 A * | 5/1995 | Bender et al. | ................. 701/513 |
| 5,878,358 A * | 3/1999 | Parsons et al. | ................... 701/1 |
| 6,108,593 A | 8/2000 | Didinsky et al. | |
| 6,108,594 A * | 8/2000 | Didinsky et al. | ............... 701/13 |
| 6,266,616 B1 * | 7/2001 | Needelman | .................... 701/513 |
| 6,285,927 B1 | 9/2001 | Li et al. | |
| 6,470,270 B1 | 10/2002 | Needelman et al. | |
| 6,691,033 B1 | 2/2004 | Li et al. | |
| 6,702,234 B1 * | 3/2004 | Goodzeit | ...................... 244/164 |
| 7,136,752 B2 * | 11/2006 | Needelman et al. | .......... 701/513 |

(Continued)

FOREIGN PATENT DOCUMENTS

| | | |
|---|---|---|
| DE | 10011890 | 9/2001 |
| DE | 102012000331 | 7/2013 |

(Continued)

*Primary Examiner* — Redhwan K Mawari
*Assistant Examiner* — Edward Torchinsky
(74) *Attorney, Agent, or Firm* — Davidson, Davidson & Kappel, LLC

(57) ABSTRACT

A method for increasing the reliability of sensor systems for determining the position of flying objects. Since the position determination is very decisive for the execution of planned missions, it is especially important to increase the reliability of such systems. The star sensors of the star systems are preferably structured identically and connected to each other by a bidirectional bus system. Due to the presence of several identical modules in the sensor system, there is an inner redundancy that can be utilized via the bus system. The bus system allows the transmission of signals of different data processing levels, so that the transmission of the data of the data processing levels can be adapted to modules that may have failed.

15 Claims, 1 Drawing Sheet

(56) References Cited

U.S. PATENT DOCUMENTS

| | | |
|---|---|---|
| 7,725,215 B2 * | 5/2010 | Stange et al. ............... 701/1 |
| 2001/0037185 A1 | 11/2001 | Strietzel et al. |
| 2002/0004691 A1 | 1/2002 | Kinashi et al. |
| 2003/0057354 A1 | 3/2003 | Wu et al. |
| 2003/0080255 A1 | 5/2003 | Li et al. |
| 2005/0133671 A1 | 6/2005 | Wang et al. |
| 2006/0149474 A1 | 7/2006 | Needelman et al. |
| 2010/0193641 A1 | 8/2010 | Liu et al. |
| 2011/0077863 A1 * | 3/2011 | Brace ...................... 701/208 |
| 2012/0257050 A1 * | 10/2012 | Simon ...................... 348/135 |
| 2013/0019073 A1 | 1/2013 | Cok |
| 2015/0310276 A1 | 10/2015 | Strietzel et al. |

FOREIGN PATENT DOCUMENTS

| | | | |
|---|---|---|---|
| EP | 135065 B1 | 3/1985 | |
| EP | 1 111 402 A1 | 6/2001 | |
| EP | 1111402 A1 * | 6/2001 | ............ G01S 3/00 |
| RU | 2304549 C2 | 8/2006 | |
| RU | 2005104609 A | 8/2006 | |
| RU | 2375680 C1 | 12/2009 | |

\* cited by examiner

METHOD FOR INCREASING THE RELIABILITY OF SENSOR SYSTEMS

This claims the benefit of German Patent Application DE 10 2012 000 331.5, filed Jan. 11, 2012 and hereby incorporated by reference herein.

The invention relates to a method for determining the position of a flying object, using a sensor system with several star sensors that detect sky sections by means of an optical system and a light-sensitive matrix detector, said sensors having the same or different fields of view and different viewing directions, and with an evaluation device for computing position information of the flying object by comparing the detected sky sections to a star catalog.

BACKGROUND

Since the position determination is very decisive for the execution of planned missions, it is especially important to increase the reliability of such systems. The star sensors consist of a lens system, a light-sensitive matrix detector and an evaluation unit for computing position information of the flying object by comparing the detected sky sections to a star catalog that is based on an inertial system. The use of several star sensors in a system enhances the reliability as well as the precision of the position measurement.

The determination of the position of such flying objects such as, for example, satellites, space stations, space shuttles and the like is made by means of a method that evaluates the data from one or more star sensors which are oriented with respect to a given area of the sky—referred to below as sky sections—by means of a prescribed field of view, and which use image recognition to compare the sky section that was detected in a matrix detector to a star catalog stored in a memory. After the association of the sky section, the position of the flying object is determined in that, for example, the Euler angle and/or quaternions are determined according to the QUEST algorithm from the measured star vectors and from the data of the star catalog, after which they are transformed from the coordinate system of the sensor system into the coordinate system of the flying object. The more stars evaluated in the sensor system, the greater its measuring precision. By orienting the individual sensors in different viewing directions, it is achieved that the errors of the three solid angles (Euler angles) are of approximately the same magnitude and are minimal.

European patent application EP 1 111 402 A1 discloses a sensor system in which three star sensors are arranged with their fields of view oriented in different directions, whereby each star sensor detects the star positions and outputs this to a central evaluating device in which the position of the sensor system is determined and the position of the flying object is determined on the basis of the orientation of the sensor system relative to a flying object. In order to avoid additional errors, the star cameras are located on a solid block.

SUMMARY OF THE INVENTION

Since the position of a flying object is crucial for accomplishing the intended mission, the sensor system must have a high level of reliability.

It is an object of the present invention to provide a sensor system for determining the position while attaining improved precision and compensating for or reducing malfunctions due to failures of individual star sensors or components of the system.

The present invention provides a method for determining the position of a flying object, using a sensor system with several star sensors that detect sky sections by means of an optical system and a light-sensitive matrix detector, said sensors having the same or different fields of view and different viewing directions, and with an evaluation device for computing position information of the flying object by comparing the detected sky sections to a star catalog, whereby the star sensors are in signal connection with each other by means of a bus system and, in this manner, data is transmitted in order to ensure a high measuring precision, even if components fail. Each individual star sensor is preferably capable of autonomously performing a position determination. In the bus system, signals such as data of different data processing levels and with a different degree of processing are exchanged, as a result of which the effect of failures of components of individual star sensors can be suppressed in accordance with their function.

In order to carry out the method, it has proven to be advantageous for one star sensor to be specified as the master sensor. The star sensor that is selected as the master sensor is preferably one that has a particularly stable attachment to a platform of the flying object.

The coordinate systems of the individual star sensors result from the x-y plane of the matrix detector and from the z-axis in the viewing direction. A master coordinate system constitutes the coordinate system of the sensor system. Here, the master coordinate system does not necessarily have to correspond to the coordinate system of the master sensor. Coordinate transformation can transform the position data from the individual star sensors of the sensor system into the master coordinate system. By the same token, the transformation of the master coordinate system into the coordinate system of the flying object can be performed by means of a position matrix, for example, in the form of a direction cosine matrix, so that the flying object receives the current and continuously corrected position in the form of Euler angles and/or quaternions.

The individual star sensors preferably include an objective, the matrix detector, a module for computing star vectors and eliminating unwanted signals, a module with a star catalog for star identification, a module for computing position information, preferably according to the QUEST algorithm, a bus control unit with a bus interface that selects and encodes the information for the bus system and that controls the bus system, and the output module for the position information of the master coordinate system or of the flying object according to the specified inertial system, as well as a supervisor unit that monitors the work of all of the modules of a sensor, that derives a quality signal and that cooperates with the bus control unit, and that ensures a practical exchange of information between the star sensors depending on quantities that determine a quality such as, for example, the function and malfunction of modules of the individual star sensors and the like. Moreover, each star sensor can have a clock generator and a power supply unit. In a preferred manner, the star sensors of the sensor system work in parallel with their modules, that is to say, in hot redundancy. In order to increase the precision of the sensor system, the position information from the sensors is combined in a function unit, for example, in the master sensor, via the bus system. Moreover, the possibility exists to compare the position information from the individual star sensors in order to ascertain possible erroneous orientations of individual star sensors. If one module fails, the next star sensor takes over the function of the failed module. For this purpose, a practical exchange of information via the bus system is needed. With an eye towards efficient and cost-effective manufacturing, the star sensors of the sensor system are structured identically and can also be used individually. If the sensor system is made of identical star sensors, enough redundant modules are available to ensure a high level of reliability along with an appropriately controlled exchange of information among the star sensors.

The bus system can exchange signals or data among the star sensors of the sensor system in preferably three data processing levels. The sensor system can be configured to be redundant or non-redundant. This means that the star sensors can detect different and/or the same fields of view.

A first data processing level relates, for example, to the measured star vectors; these are unit vectors in the sensor coordinate system that are detected by the matrix detector. The data is simply preprocessed in that extraneous light sources are sorted out. They have undergone an analog-digital conversion, and a sub-pixel interpolation was already carried out. The scope of the data to be transmitted on this level depends on the number of stars observed in the sensor in question.

Processed data is transmitted in a second data processing level that is preferred for the exchange of data between the star sensors. The sky section identification is needed in order to generate this data. Expressions are computed which are then used for executing the QUEST algorithm. The advantage of this type of data transmission is that fewer resources are needed for its transmission via the signal connection while a degree of precision is achieved that is comparable to the data of the first data processing level.

Since the position computation in star sensors is preferably carried out by means of the so-called QUEST algorithm, data preprocessing can be carried out in the second data processing level, for example, as follows:
The elements of a quaternion vector q that indicates the position of a sensor system result from the eigen values of the 4×4 matrix K:

$$K = \begin{pmatrix} S - 1\sigma & Z \\ Z' & \sigma \end{pmatrix} \quad (1)$$

wherein $$B = \sum_i v_i \cdot w_i' \quad (2)$$

$$S = B' + B \quad (3)$$

$$\sigma = \mathrm{trace}(B) \quad (4)$$

$$Z = \sum_i v_i \cdot w_i \quad (5)$$

and the 3×3 unit matrix 1.

The 3×3 matrix B and the vector Z contain the measured star vectors $v_i$ and the associated reference vectors $w_i$ from the star catalog. Due to the additive combination of the star vectors in Equations (2) and (5), the matrix B and the vector Z can be used as interface quantities of the second data processing level as preprocessed star vectors and can be transmitted via the bus system:

$$B = \Sigma B_k \quad (6)$$

$$Z = \Sigma Z_k \quad (7)$$

$B_k$ and $Z_k$ are the data from the $k^{th}$ star sensor. In this manner, in comparison to the first data processing level, a consistent level of precision of the star vector combination is achieved with a small number of variables and consequently, fewer resources are needed for the transmission.

In a third data processing level, the position information is provided in the form of Euler angles and/or quaternions by each individual star sensor and transformed into the master coordinate system. This data can likewise be transmitted via the bus system. Generally speaking, the computed Euler angles and/or quaternions of the individual star sensors only differ slightly from each other. The resulting position of the flying object, relative to the master coordinate system, can then be computed by averaging the appertaining Euler angles or the elements of the quaternion vector. As an alternative or in addition to this computation method, computations of the position of the flying object can be made on the basis of the first and/or second data processing level. Deviations from a quantity of the position data from a star sensor that has been prescribed, for instance, by averaging the data from the other star sensors, indicate a malfunction or incorrect orientation of the star sensor in question. The position data from the communicating star sensors can be used to correct incorrect orientations. Here, the position data from the master sensor, which has a particularly stable attachment to the platform of the flying object, can serve as the reference. The deviations of the position data of a sensor are used to compute a position matrix with which the star vectors of the incorrectly oriented star sensor are transformed before the further processing so as to compensate for the possible incorrect orientation of a star sensor and to increase the resultant level of precision. The use of this data processing level for mutual correction of any deviations that might be present is characterized by especially simple data transmission and simple compensation of any deviations that might be present in the determined positions of the star sensors, for example, in the master coordinate system, in the coordinate system of the flying object or in the inertial system of the star catalog.

The cooperation of star sensors in various levels having a different degree of processing of the data also makes it possible to compensate for failures of modules of one or more star sensors. This is especially important since the star sensors are located on the outer skin of the flying object, where they are exposed to particularly severe environmental conditions. If, for example, a supervisor unit of a star sensor ascertains the failure of the module for sky section identification, then the star vectors can be transmitted to another star sensor, preferably to the master sensor. The sky section identification and the further data processing can then be carried out there.

The three described data processing levels allow a high flexibility along with a reliable operation of the star sensors. Table 1 below provides an overview of the behavior of a sensor system on the basis of typical, but not comprehensively listed, failures, whereby the states indicated in boldface can be resolved with increased measuring precision by means of the proposed method.

TABLE 1

| Failed module | Measure | Result |
| --- | --- | --- |
| optical system and matrix detector | the sensor in question is preferably switched off | reduced precision in the position determination |
| computation of the star vectors | the sensor in question is preferably switched off or its operation is reduced | reduced precision in the position determination |
| star identification | the star vectors are transmitted to another | no loss of precision |

TABLE 1-continued

| Failed module | Measure | Result |
|---|---|---|
| | sensor by means of the bus system | |
| position computation, quaternion computation | the preprocessed star vectors are transmitted (medium processing level) | no loss of precision |
| output interface | the preprocessed star vectors are transmitted (medium processing level) | no loss of precision |
| power supply unit | the sensor is switched off | loss of precision in the position determination |

Malfunction-free operation is preferably achieved by means of the master sensor that receives the position information from the other star sensors, preferably by means of the medium processing level. The other star sensors function in hot redundancy and likewise supply position information, but with less precision. By suitably defining a direction cosine matrix, major deviations of the computed position from the position of the master sensor can be used to correct the star vectors of the incorrectly oriented star sensor.

A flying object contains the star sensors that are optimized for carrying out the method and that are especially configured with an eye towards high precision, low stray light influence, great mechanical stability, high radiation resistance, low power consumption, low weight, sufficient computing capacity and adequate size of the star catalog.

Preferably, star sensors with a field of view of approximately 20°×20° or else a circular field of view of 20° are used.

The networked star sensors of a sensor system for carrying out the method being put forward here can especially be used in a conventional manner in case of failure of one or more star sensors or of the bus system.

Aside from the proposed method, the invention also comprises a sensor system with star sensors that are networked with each other as described in this application documentation for carrying out the method being put forward here.

BRIEF DESCRIPTION OF THE DRAWINGS

The invention is explained in greater detail on the basis of the embodiments shown in FIGS. 1 and 2. The following is shown.

DETAILED DESCRIPTION

Figure 1:
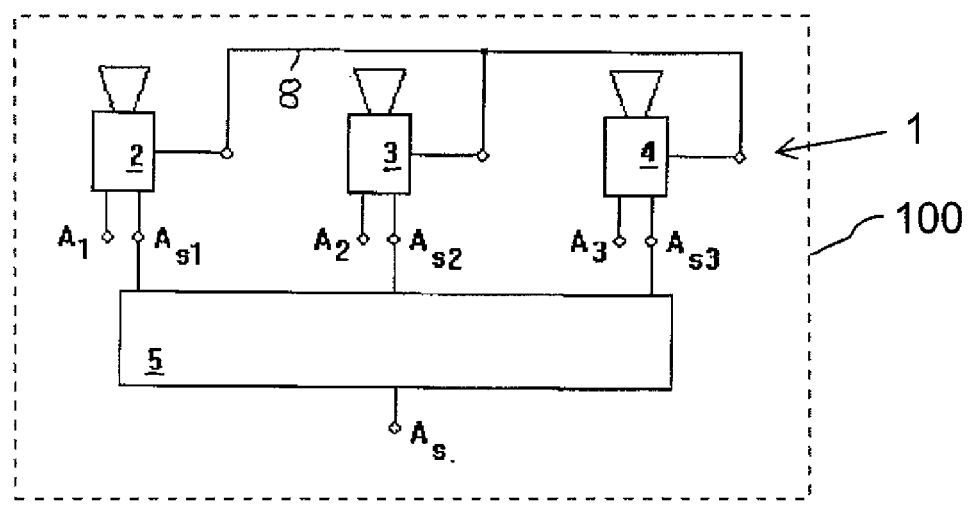
FIG. 1 a schematic depiction of a sensor system with a bus for signal connection to the star sensors, FIG. 2 a schematic depiction of a star sensor with its modules.

FIG. 1 shows the sensor system 1 installed in a schematically depicted flying object 100, having the star sensors 2, 3, 4 that are in signal connection via the bus system 8. In contrast to the simplified depiction, the star sensors 2, 3, 4 are preferably oriented on the basis of their optical axes in three different spatial directions. The signal connection established via the bus system 8 transmits data bidirectionally, for instance, from three different data processing levels, in response to the instructions of the bus control units of the individual sensors 2, 3, 4. As an alternative, additional interfaces with different signal connections can be provided on the star sensors 2, 3, 4. During malfunction-free operation, the preprocessed signals of the second data processing level of the star sensors 3 and 4 are transmitted to the star sensor 2 that is provided as the master sensor. The further data processing then takes place in the master sensor, preferably with the QUEST algorithm and with the requisite transformations for determining the position of the master coordinate system and the position of the flying object in the form of Euler angles and/or quaternions. Parallel to this, during malfunction-free operation, the star sensors 3, 4, which are not the master sensor, autonomously use their own measured star vectors to determine the positions of the star sensors 3, 4, and they transform them into the master coordinate system. When all of the star sensors 2, 3, 4 are functioning properly, essentially the same position data pertaining to the master coordinate system is obtained. If the master sensor in the form of the sensor 2 fails, then one of the star sensors 3, 4 of the sensor system 1 takes over the function of the master sensor. When modules of the star sensors 3, 4, which are not the master sensor, fail, then the supervisor unit ascertains the data processing level in which error-free signals of the malfunctioning sensor can be transferred to the master sensor, so that the resulting position signal can be determined from as many stars as possible. Aside from supply connections, the star sensors 2, 3, 4 also each have two outputs of which the outputs $A_1, A_2, A_3$ serve to output the uncorrected position, for example, in the form of a quaternion vector, while the outputs $A_{s1}, A_{s2}, A_{s3}$ each indicate a corrected position of the star sensor 2, 3, 4 in question, for example, in the form of a quaternion vector, whereby this position is preferably corrected by means of the data from the other star sensors. The outputs $A_{s1}, A_{s2}, A_{s3}$ are detected by the evaluation unit 5, where they are determined—for example, with an appropriate weighting of reliable position information, with suppression of unreliable location information and the like—as a combined position that can be transformed, for example, by the master coordinate system, into a coordinate system of the flying object, after which it is output, for instance, as a quaternion vector via the output $A_s$ to a control unit of the flying object.

Figure 2:
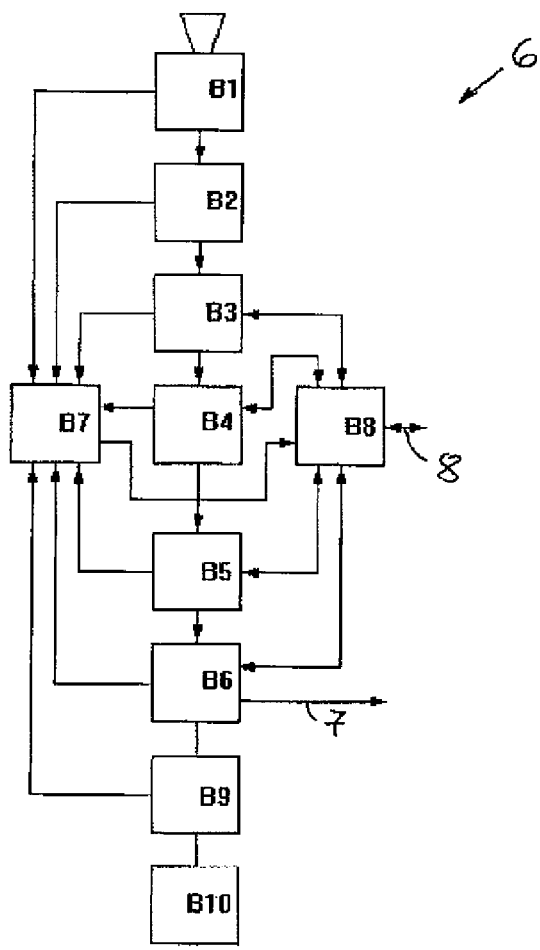

FIG. 2 shows a schematic depiction of the star sensor 6, which corresponds essentially to the star sensors 2, 3, 4 of FIG. 1, including a camera B1 with an objective and a matrix detector, of an analog data preprocessing unit B2 that carries out a subsequent AD conversion, of a digital data processing B3 that performs centroiding and star vector computation, of a sky section identification unit B4 that has a star catalog, of a unit B5 that computes the quaternions and/or Euler angles, of an output interface B6 that computes the resultant or corrected position data and that transmits this data to the flying object via the data line 7, of a supervisor unit B7 that monitors the function of the modules of the star sensor 6, of a bus control unit B8, of a clock generator B9 and of a power supply B10. In case of malfunction-free operation, the bus system 8 transmits preferably the signals $B_k$ and $Z_k$ of the second data processing level from the other star sensors to the master sensor. If the supervisor unit B7 ascertains malfunctions, depending on the malfunctioning module, a signal transmission is selected that achieves the maximum precision for the sensor system 1 (FIG. 1). The processing unit 5 (FIG. 1) for correcting position data can be implemented in the star sensors or else as an autonomous unit. Although all of the star sensors of the sensor system are preferably structured identically, depending on the operating states of the flying object and/or of the sensor system, a few modules can be switched off or not implemented, for example, in order to save energy.

LIST OF REFERENCE NUMERALS 1 sensor system
2 star sensor 3 star sensor
4 star sensor
5 evaluation unit
6 star sensor
7 data line
8 bus system
$A_1$ output
$A_2$ output
$A_3$ output
$A_{s1}$ output
$A_{s2}$ output
$A_{s3}$ output
$A_s$ output
B1 star camera with an objective and a matrix detector
B2 analog data preprocessing and AD conversion
B3 digital data processing, centroiding and star vector computation
B4 sky section identification with star catalog
B5 computation of the quaternions and/or Euler angles
B6 output interface
B7 supervisor unit
B8 bus control unit
B9 clock generator
B10 power supply

What is claimed is:

1. A method for determining an attitude of a flying object using a sensor system with several star sensors detecting sky sections using an optical system and a light-sensitive matrix detector, each of the sensors having a field of view size and different viewing directions, the method comprising:
    computing attitude information of the flying object using an evaluation device by comparing the detected sky section to a star catalog;
    exchanging data for improving the measuring precision and the reliability via a bus system connecting the star sensors in signal connection with each other; and
    wherein the data includes data from at least one star sensor of at least one data processing level of different data processing levels transmitted via the bus system to another star sensor.

2. The method as recited in claim 1 wherein the star sensors have the same field of view size.

3. The method as recited in claim 1 wherein the star sensors have different field of view sizes.

4. The method as recited in claim 1 wherein the data is from different data processing levels.

5. The method as recited in claim 4 wherein a first data processing level of the different data processing levels comprises measured star vectors.

6. The method as recited in claim 4 wherein a second data processing level of the different data processing levels comprises data processed from star vectors on the basis of a star catalog.

7. The method as recited in claim 4 wherein a third data processing level of the different data processing levels comprises position information in the form of Euler angles and/or quaternions of a star sensor.

8. The method as recited in claim 4 wherein the data includes data of at least one data processing level of the different data processing levels from at least one star sensor transmitted to the evaluation unit or to a star sensor used as the master sensor.

9. The method as recited in claim 4 wherein the attitude of the flying object is determined by averaging the data of at least one of the data processing levels of the different data processing levels.

10. The method as recited in claim 4 further comprising ascertaining a malfunction of one of the star sensors on the basis of a deviation from an averaged value of the other star sensors, the deviation being prescribed in at least one data processing level of the different data processing levels.

11. The method as recited in claim 4 further comprising correcting a malfunction and/or an incorrect orientation of one of the star sensors using the data of at least one data processing level of the different data processing levels from at least one star sensor of the star sensors.

12. The method as recited in claim 4 further comprising defining one star sensor of the star sensors as a master sensor and using data of at least one data processing level of the master sensor for determining or correcting an attitude of the flying object and/or for correcting a star sensor of the star sensors.

13. The method as recited in claim 12 wherein the master sensor is more firmly attached to a platform of the flying object as compared to the other star sensors.

14. The method as recited in claim 1 wherein in the event of malfunction of the one of the star sensors connected to the bus system, corresponding data of another star sensor connected to the bus system is used.

15. A sensor system for regulating the attitude of a flying object, comprising:
    several star sensors detecting sky sections via an optical system and a light-sensitive matrix detector, the sensors having a field of view size and different viewing directions; and
    an evaluation device for computing attitude information of the flying object by comparing the detected sky sections to a star catalog, the evaluation device carrying out method as recited in claim 1.

* * * * *